(12) United States Patent
Park et al.

(10) Patent No.: US 8,942,714 B2
(45) Date of Patent: Jan. 27, 2015

(54) METHOD OF CONTROLLING INTERFERENCE FROM FEMTOCELLS IN CONSIDERATION OF MACROCELL

(75) Inventors: Soon Gi Park, Daejeon (KR); Yeon Seung Shin, Daejeon (KR); Pyeong Jung Song, Daejeon (KR); Young Jick Bahg, Daejeon (KE); Yeong Jin Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 361 days.

(21) Appl. No.: 13/334,373

(22) Filed: Dec. 22, 2011

(65) Prior Publication Data

US 2012/0165032 A1 Jun. 28, 2012

(30) Foreign Application Priority Data

Dec. 23, 2010 (KR) .................. 10-2010-0133286

(51) Int. Cl.
| | |
|---|---|
| H04W 72/00 | (2009.01) |
| H04W 52/14 | (2009.01) |
| H04W 52/26 | (2009.01) |
| H04W 52/32 | (2009.01) |
| H04W 52/36 | (2009.01) |
| H04W 16/32 | (2009.01) |
| H04W 24/10 | (2009.01) |
| H04W 28/04 | (2009.01) |
| H04W 72/08 | (2009.01) |
| H04W 84/04 | (2009.01) |

(52) U.S. Cl.
CPC .......... *H04W 52/143* (2013.01); *H04W 52/265* (2013.01); *H04W 52/325* (2013.01); *H04W 52/367* (2013.01); *H04W 16/32* (2013.01); *H04W 24/10* (2013.01); *H04W 28/048* (2013.01); *H04W 72/085* (2013.01); *H04W 84/045* (2013.01)
USPC ..................... 455/452.1; 455/452.2

(58) Field of Classification Search
USPC .......... 455/452.1–452.2, 450, 453, 448, 446, 455/426.1
See application file for complete search history.

(56) References Cited

U.S. PATENT DOCUMENTS

| | | | |
|---|---|---|---|
| 8,630,242 B2 * | 1/2014 | Lee et al. ...................... 370/329 |
| 2006/0094363 A1 | 5/2006 | Kang et al. |
| 2006/0268755 A1 | 11/2006 | Pajukoski et al. |
| 2007/0153834 A1 | 7/2007 | Qu et al. |
| 2010/0151894 A1 | 6/2010 | Oh et al. |
| 2010/0329132 A1 * | 12/2010 | Raghothaman et al. ...... 370/252 |
| 2011/0250917 A1 * | 10/2011 | Zhu et al. ...................... 455/509 |
| 2011/0275361 A1 * | 11/2011 | Yavuz et al. ............... 455/422.1 |

FOREIGN PATENT DOCUMENTS

| | | |
|---|---|---|
| KR | 1020060037572 | 5/2006 |
| KR | 1020100067775 | 6/2010 |

* cited by examiner

*Primary Examiner* — Brandon Miller
(74) *Attorney, Agent, or Firm* — NSIP Law

(57) ABSTRACT

A method of controlling femtocell interference considering a macrocell is provided. The method of controlling the interference includes a method of setting transmission power of the femtocell and methods of avoiding the interference of the femtocell. The methods of avoiding the interference include a PRB rotation method, a PRB transmission power restriction method, a hybrid method and a UB rotation method. The method of setting the transmission power and the methods of avoiding the interference may be implemented independently or implemented in combination with each other. Hence, according to the present invention, the femtocell itself can control the interference without affecting an interface of an existing macrocell base station and without signaling through the interface with the macrocell.

5 Claims, 4 Drawing Sheets

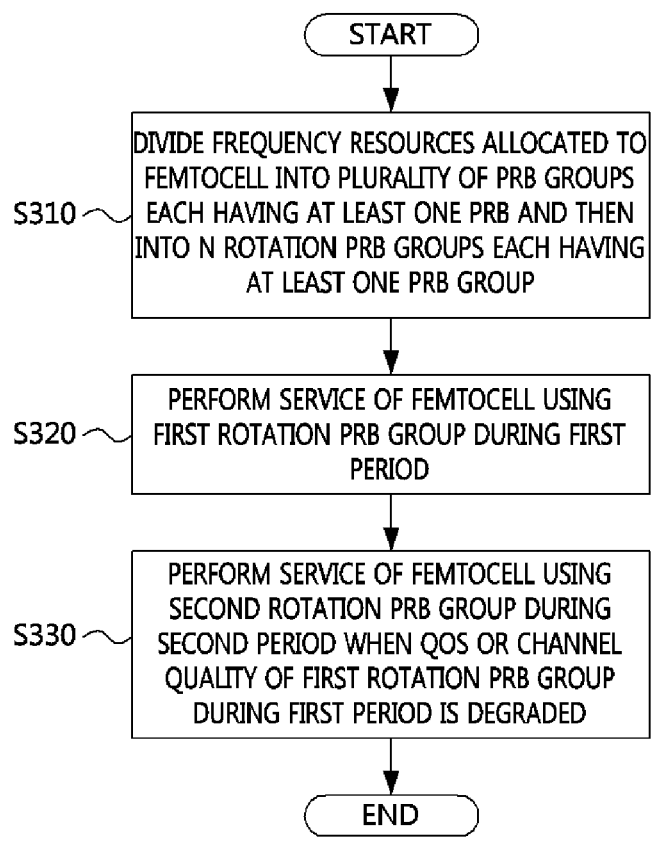

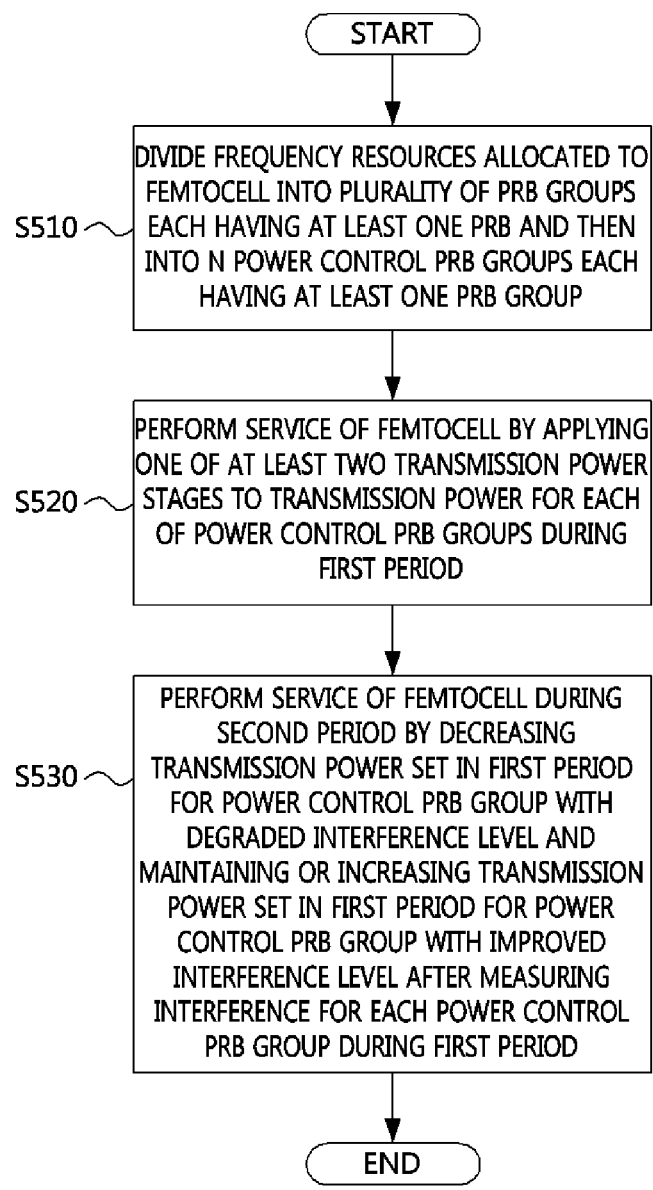

FIG. 6

| (G)PRB | Time 0 | Time 1 | Time 2 | Time 3 |
|---|---|---|---|---|
| 0 | X | X | X | X |
| 1 | X | X | X | X |
| 2 | O, Ptx(HIGH) | O, Ptx(HIGH) | O, Ptx(MEDIUM) | O, Ptx(MEDIUM) |
| 3 | O, Ptx(HIGH) | O, Ptx(HIGH) | O, Ptx(MEDIUM) | O, Ptx(OFF) |
| 4 | O, Ptx(HIGH) | O, Ptx(HIGH) | O, Ptx(MEDIUM) | O, Ptx(HIGH) |
| 5 | O, Ptx(HIGH) | O, Ptx(HIGH) | O, Ptx(HIGH) | O, Ptx(HIGH) |
| 6 | O, Ptx(HIGH) | O, Ptx(HIGH) | O, Ptx(HIGH) | O, Ptx(HIGH) |
| 7 | O, Ptx(HIGH) | O, Ptx(HIGH) | O, Ptx(HIGH) | O, Ptx(HIGH) |
| 8 | O, Ptx(HIGH) | O, Ptx(HIGH) | O, Ptx(HIGH) | O, Ptx(MEDIUM) |
| 9 | O, Ptx(HIGH) | O, Ptx(HIGH) | O, Ptx(HIGH) | O, Ptx(HIGH) |
| 10 | O, Ptx(HIGH) | O, Ptx(HIGH) | O, Ptx(HIGH) | O, Ptx(HIGH) |
| 11 | O, Ptx(HIGH) | O, Ptx(HIGH) | O, Ptx(HIGH) | O, Ptx(HIGH) |

X — UNUSED (G)PRB
O — USED (G)PRB
O — INTERFERENCE IS SENSED (HIGH)
O — INTERFERENCE IS SENSED (MEDIUM)
O — INTERFERENCE IS SENSED (LOW)

FIG. 7

START

S710 — PERFORM SERVICE OF FEMTOCELL USING FIRST FREQUENCY BAND DURING FIRST PERIOD

S720 — PERFORM SERVICE OF FEMTOCELL USING SECOND FREQUENCY BAND DURING SECOND PERIOD

END

METHOD OF CONTROLLING INTERFERENCE FROM FEMTOCELLS IN CONSIDERATION OF MACROCELL

CLAIM FOR PRIORITY

This application claims priority to Korean Patent Application No. 10-2010-0133286 filed on Dec. 23, 2010 in the Korean Intellectual Property Office (KIPO), the entire contents of which are hereby incorporated by reference.

BACKGROUND

1. Technical Field

Example embodiments of the present invention relate in general to a mobile telecommunication technique, and more particularly, to a method of controlling interference of a femtocell to have the femtocell itself avoid the interference on a macrocell and also have the macrocell not be interfered with by the femtocell at the time of initial installation and management of the femtocell in an environment where the macrocell and the femtocell overlap.

2. Related Art

Controlling inter-cell interference becomes an important issue in a case of a $4^{th}$ mobile telecommunication system using an orthogonal frequency division multiplexing (OFDM) technique, and in particular, solving interference between a macrocell and a femtocell becomes an important issue in a heterogeneous network where the macrocell and the femtocell overlap.

Frequency allocation schemes for the femtocell and the macrocell are broadly classified into two types. One is a co-channel frequency allocation scheme in which the macrocell and the femtocell share the same frequency band, and the other is an orthogonal channel frequency allocation scheme in which the macrocell and the femtocell use the full frequency band with no frequency overlapping between the macrocell and the femtocell.

In the former case, although there is interference between the macrocell and the femtocell, a frequency use ratio is high. In the latter case, although there is no interference between the macrocell and the femtocell in the full frequency band, the frequency use efficiency is poor.

That is, in the case of the co-channel frequency allocation scheme, solving the interference between the macrocell and the femtocell becomes an important issue. In particular, there is a difference between transmission powers of respective base stations of the macrocell and femtocell, and the interference from the macrocell to the femtocell is negligible due to a relative distance, however, the interference from the femtocell to the macrocell may be problematic.

Techniques of controlling the interference between the macrocell and the femtocell according to the related art may employ a coordination method between the macrocell and the femtocell. Such a coordination method allows finer tuning to be performed between the macrocell and the femtocell. However, considering actual femtocell deployment situations (e.g., open/closed/hybrid), exchanging messages for coordination between numerous femtocells and the macrocell is not feasible in practice. The coordination method causes many signaling loads on the network, an algorithm for handling the signaling loads has a high level of complexity, and femtocell costs increase significantly. Further, the macrocell must also be upgraded.

SUMMARY

Example embodiments of the present invention provide a method of setting transmission power of a femtocell that allows the femtocell to automatically set transmission power of the femtocell.

Example embodiments of the present invention also provide a method of allowing a femtocell itself to control interference without affecting an interface of an existing macrocell base station and without coordination with the macrocell through the interface with the macrocell.

In some example embodiments, a method of setting transmission power of a femtocell includes: (a) measuring or estimating received power (PM) from a macrocell base station; (b) multiplying the measured or estimated received power from the macrocell base station by a linear coefficient $\alpha$; (c) adding, to a value obtained in operation (b), a minimum value $\beta$ of the transmission power of the femtocell when the measured or estimated received power from the macrocell base station is 0; and (d) selecting a minimum value between a value obtained in operation (c) and a maximum transmission power value of the femtocell, and setting, as the transmission power of the femtocell, a maximum value between the selected minimum value and a minimum transmission power value of the femtocell.

Here, in operation (a), the estimating of the received power from the macrocell base station may include receiving a position and a transmission power value of the macrocell base station, and estimating the received power from the macrocell based on the received value and the position. In this case, the femtocell may receive the position and the transmission power value of the macrocell base station from a component in a network performing automatic neighbor relation (ANR).

Here, in operation (a), the estimating of the received power from the macrocell base station may include allowing the femtocell to operate as a macrocell by setting a cell type of the femtocell to the macrocell during a predetermined period, and allowing a nearby terminal to measure the received power from the macrocell base station when the nearby terminal is accessed to the femtocell and estimating the received power from the macrocell base station based on the measured received power.

Here, the linear coefficient may be set by the scale of the macrocell.

In other example embodiments, a method of controlling interference of a femtocell includes: (a) dividing frequency resources allocated to the femtocell into a plurality of physical resource block (PRB) groups each having at least one PRB and then into n (n is a natural number not less than 2) rotation PRB groups each having at least one PRB group; (b) performing a service of the femtocell using a first rotation PRB group among the rotation PRB groups during a first period; and (c) performing a service of the femtocell using a second rotation PRB group during a second period after the first period when a channel quality of the first rotation PRB group during the first period is not greater than a predetermined threshold or when a quality of service (QoS) is not ensured.

Here, in operation (c), determining whether the channel quality of the first rotation PRB group is not greater than the predetermined threshold may be based on channel quality information (CQI) notified from a terminal connected to the femtocell.

Here, the PRBs included in the first rotation PRB group and the PRBs included in the second rotation PRB group may not overlap each other.

Here, the PRBs included in the first rotation PRB group and the PRBs included in the second rotation PRB group may overlap each other at least partially.

Here, the frequency resources allocated to the femtocell may include at least one between a downlink frequency resource from the femtocell and an uplink frequency resource to the femtocell.

In still other example embodiments, a method of controlling interference of a femtocell includes: (a) dividing frequency resources allocated to the femtocell into a plurality of PRB groups each having at least one PRB and then into n (n is a natural number not less than 2) power control PRB groups each having at least one PRB group; (b) performing a service of the femtocell by applying one of at least two transmission power stages to transmission power for each of the power control PRB groups during a first period; and (c) performing a service of the femtocell during a second period after the first period by decreasing the transmission power stage (i.e., applying low transmission power) set in the first period for the power control PRB group with a degraded interference level and maintaining or increasing the transmission power stage (i.e., applying high transmission power) set in the first period for the power control PRB group with an improved interference level after measuring the interference for each of the power control PRB groups during the first period.

Here, in operation (b), when the first period is one that performs the service with initial transmission power of the femtocell, the highest transmission power among the transmission power stages may be set as a stage that can be used for all of the n power control PRB groups.

Here, in operation (c), when the power control PRB group to which the lowest transmission power stage is applied does not have an improved interference level even after the second period, the femtocell may not perform the service through the power control PRB group.

In yet other example embodiments, a method of controlling interference of a femtocell in which plural frequency bands capable of being allocated by a service provider are present includes: (a) performing a service of the femtocell using a first frequency band during a first period; and (b) performing a service of the femtocell using a second frequency band during a second period after the first period.

Here, the method of controlling the interference of the femtocell may be applied to a femtocell located in an inner cell region (ICR) of a macrocell using the same UB (Used Band; operation carrier). Alternatively, the method of controlling the interference of the femtocell may be performed by determining that a location of a macrocell base station is close to a location of the femtocell itself based on information about a macrocell included in ANR after the femtocell receives a message from the ANR.

BRIEF DESCRIPTION OF DRAWINGS

Example embodiments of the present invention will become more apparent by describing in detail example embodiments of the present invention with reference to the accompanying drawings, in which:

FIG. 3 is a flow chart for explaining a PRB rotation method among interference avoiding methods of a femtocell in accordance with an example embodiment of the present invention;

FIG. 4 is a frequency resource management diagram over time for explaining a PRB rotation method among interference avoiding methods of a femtocell in accordance with an example embodiment of the present invention;

FIG. 5 is a flow chart for explaining a method of restricting PRB transmission power among interference avoiding methods of a femtocell in accordance with an example embodiment of the present invention;

FIG. 6 is a frequency resource and transmission power management diagram over time for explaining a method of restricting PRB transmission power among interference avoiding methods of a femtocell in accordance with an example embodiment of the present invention; and FIG. 7 is a flow chart for explaining an UB (used band) rotation method among interference avoiding methods of a femtocell in accordance with an example embodiment of the present invention.

DESCRIPTION OF EXAMPLE EMBODIMENTS

Figure 1:
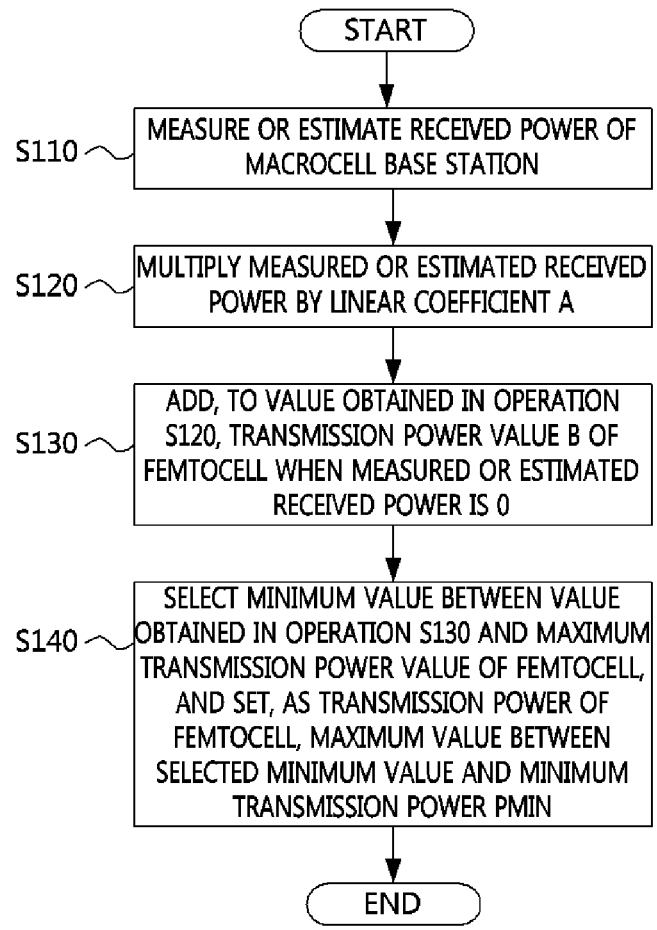
FIG. 1 is a flow chart for explaining a method of setting transmission power of a femtocell in accordance with an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "terminal" may indicate a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, mobile or other terms. Various example embodiments of the terminal may include, but not limited to, a cellular phone, a smart phone having a wireless communication function, a personal digital assistant (PDA) having a wireless communication function, a wireless modem, a portable computer having a wireless communication function, an imaging device such as a digital camera having a wireless communication function, a gaming device having a wireless communication function, music storing and reproducing home appliances having a wireless communication function, internet home appliances capable of performing wireless Internet access and browsing, or portable units or terminals incorporating combinations thereof.

As used herein, a "base station" is generally a fixed or mobile point in communication with the terminal, and may indicate a base station, a node B, an evolved node B (eNode-B), a base transceiver system (BTS), an access point, a relay, a femtocell, etc.

Hereinafter, preferred example embodiments of the present invention will be described in detail with reference to accompanying drawings.

A method of controlling interference of a femtocell according to an example embodiment of the present invention includes a method of setting transmission power of the femtocell and methods of avoiding the interference of the femtocell. The methods of avoiding the interference include 1) a method of rotating a physical resource block (PRB), 2) a method of limiting transmission power of the PRB, 3) a hybrid method of combining methods 1) and 2), and 4) an UB rotation method. The method of setting the transmission power and the methods of avoiding the interference may be implemented independently, or may be implemented in combination with each other.

Hereinafter, the methods of controlling the interference will be described in order.

Method of Setting Transmission Power at Femtocell According to an Example Embodiment of the Present Invention FIG. 1 is a flow chart for explaining the method of setting the transmission power of the femtocell according to an example embodiment of the present invention.

Referring to FIG. 1, the method of setting the transmission power of the femtocell according to an example embodiment of the present invention may include (a) measuring or estimating received power from a macrocell base station (S110); (b) multiplying the measured or estimated received power from the macrocell base station with a linear coefficient (S120); (c) adding, to a value obtained in the multiplying, the transmission power of the femtocell when the measured or estimated received power from the macrocell base station is 0 (S130); and (d) selecting a minimum value between a value obtained in the adding and a maximum transmission power value of the femtocell, and setting, as the transmission power of the femtocell, a maximum value between the selected minimum value and a minimum transmission power value of the femtocell (S140).

Setting the transmission power of the femtocell performed according to operations S110 to S140 can be represented by equation 1 below.

$$Ptx(HeNB) = \max(\min(\alpha \cdot PM + \beta, P\max), P\min) \text{ [dBm]} \quad \text{[Equation 1]}$$

where Ptx(HeNB) is the transmission power of the femtocell to be obtained according to operations S110 to S140 described above, and Pmax is the maximum transmission power of the femtocell. Pmin is the minimum transmission power of the femtocell and will typically be 0 dBm. PM is the received power from the macrocell signal that is received from the macrocell to be measured or estimated. $\alpha$ is the linear coefficient that can be adjusted based on the size difference between macrocells or allows a slope of a power mapping curve to be changed. $\beta$ is a parameter represented by dB and corresponds to a transmission power value of the femtocell when the measured or estimated received power from the macrocell is 0 in the PM range covered by a dynamic range for power control.

Figure 2:
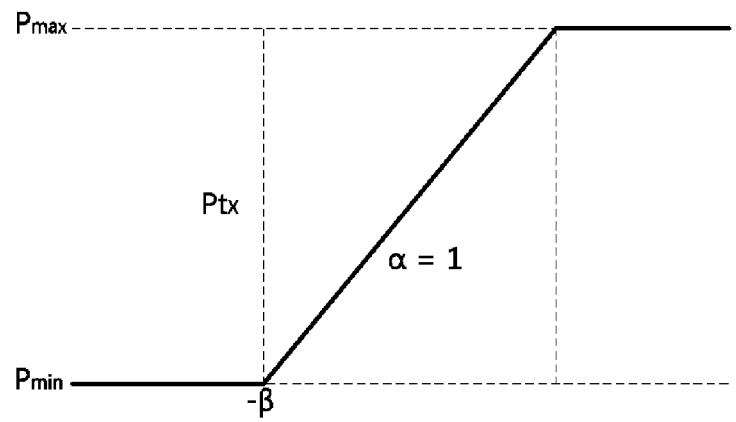
FIG. 2 is a graph for explaining a method of setting transmission power of a femtocell in accordance with an example embodiment of the present invention.

FIG. 2 is a graph for further explaining a method of setting the transmission power of the femtocell in accordance with an example embodiment of the present invention, wherein the meanings of $\alpha$ and $\beta$ can be described with reference to FIG. 2. $\alpha$ indicates the slope, and $\beta$ indicates the power value when the PM is 0. When $\beta$ is 0, the value at PM=0 is equal to Pmin.

Ptx(HeNB) of the femtocell base station cannot exceed the maximum 20 dBm (because the femtocell coverage is limited), and is determined at 20 dBm or less using the PM that is estimated by the network layer or received from the macrocell base station to be measured.

Here, PM may indicate the received power from the macrocell measured by a terminal (e.g., a macro UE that will be described later) connected to the macrocell, the measured received power from the macrocell when the femtocell has a function of measuring the received power from the macrocell, or a value estimated by the network layer. In this case, there are three methods of obtaining the PM.

The first method is to have the femtocell receive, in aid of the automatic neighbor relation (ANR) component, the location and transmission power of the macrocell that may be under influence and to estimate the PM using a general equation or a given equation (e.g. path loss calculation equation) through the location of the femtocell.

When the femtocell is installed or enters the initialization for other reasons, the femtocell may receive information of the various macrocell base stations from the ANR component several times, or may receive the information by grouping various macrocell base stations that may be under influence at once. At this time, the femtocell may estimate the PM through the operations below.

Operation 1) The femtocell searches for the macrocell base station that has the same UB as the femtocell among macrocell base station information received from the ANR component. The femtocell calculates the location from its femtocell base station.

Operation 2) The femtocell estimates the PM of the macrocell base station using the transmission power information of the macro station, the location information of the femtocell, and the location information of the base station having the same UB in operation 1). For instance, the general equation or the given path loss equation may be used.

Operation 3) The transmission power of the femtocell can be determined using equation 1 based on the estimated PM.

The second method is to have the femtocell operate as the macrocell base station during a predetermined period, have a nearby macro terminal access the femtocell, and have the corresponding macro terminal measure the received power from the macrocell to estimate the PM. The second method may be performed by the operations below.

Operation 1) The femtocell puts off setting the closed subscriber group (CSG) field of the master information block (MIB) at the time of initial installation and as necessary (i.e., the femtocell operates as the macrocell base station).

Operation 2) The macro UE outdoors near the femtocell may perform registration. In this case, the registration result may or may not be successful in accordance with the relation between the femtocell and the macro terminal. For example, the registration result may or may not be successful based on in which state the femtocell is (open/hybrid/closed) and whether the corresponding terminal is the macro terminal and CSG terminal. In the registration operation, the femtocell may collect PM from the macrocell base station. The femtocell is in an RRC_CONNECTED state even when the actual registration is not successful, so that the femtocell may instruct the macrocell to measure the macrocell base station corresponding to the UB of the measurement through a "measConfig" to ensure that the femtocell has the PM of the macrocell base station, and may disconnect wireless connection of the macro terminal. The measurement may be controlled using the ANR information.

Operation 3) The transmission power of the femtocell of the equation 1 is determined by the measurement obtained in operation 2) (i.e., PM of the equation). Operations 1 and 2 may be performed by one PM measurement from the macro terminal or may also be performed based on the PM measurements collected by the macro terminal during a predetermined period. Various algorithms may be applied for the number of measurements and related statistics. However, ICR, CERI or II, no region may be determined and a priority of the algorithm per region may be changed based on such measurements.

Operation 4) When the transmission power to be applied is determined, a CSG field is set in the MIB and then the femtocell is made to operate as the femtocell base station.

The operations described above may be performed not only at an initial installation of the femtocell but also on demand and decision of the femtocell. Such operations may be referred to as training operations. Start and stop of the training operations, and the number and period of measurements on the received power from the macrocell base station by the M UE in the training operations may be tuned in accordance with the situation.

The third method is to have the femtocell directly measure the received power from the macrocell on the UB used by the femtocell.

The third method increases the unit price of the femtocell but can eliminate message exchange operations performed in the first method. The third method is to allow the femtocell base station to have some functions of the macro terminal (i.e., function of measuring the macrocell base station). Since the femtocell base station directly performs the measurement, the training period that is relatively long in the second method is not required, and the macro terminal does not necessarily approach the femtocell base station, unlike the first method.

The three methods described above each have advantages and disadvantages. Hence, combined methods may be utilized rather than only one method.

Hereinafter, an interference avoiding method among the methods of controlling the interference according to example embodiments of the present invention will be described. In this case, there are three assumptions on the interference avoiding method according to example embodiments of the present invention.

Assumption 1) When the macrocell does not use the full frequency band, preferred bands for the inner cell region (ICR) or the cell edge region (CER) may be present.

Assumption 2) When the femtocell does not need to use the full frequency band or when the allocated QoS or the channel quality for the allocated band is not ensured, a scheduler of the femtocell may apply, based on assumption 1, an interference avoiding method 1 to be described later.

Assumption 3) The downlink transmission power is determined by the method of setting the initial power of the femtocell described above. On the other hand, determination of the uplink transmission power of the terminal is broadly performed through the closed-loop power control in proportion to the transmission power of the femtocell. The interference measurement on the uplink may be performed per PRB by the base station. On the other hand, the downlink interference is measured by the terminal, and related information is delivered at an L2-L2 or L3-L3 level to have the L3 of the femtocell collect such measurement information. The interference information on the uplink (G)PRB may be provided back to the terminal. That is, all interference information to be measured is collected at the radio resource management (RRM) of the femtocell.

Interference Avoiding Method 1—PRB Rotation

FIG. 3 is a flow chart for explaining the PRB rotation method among interference avoiding methods of the femtocell in accordance with an example embodiment of the present invention.

Referring to FIG. 3, the PRB rotation method among interference avoiding methods of the femtocell in accordance with an example embodiment of the present invention includes (a) dividing frequency resources allocated to the femtocell into a plurality of PRB groups each having at least one PRB and then into n (n is a natural number not less than 2) rotation PRB groups each having at least one PRB group (S310); (b) performing a service of the femtocell using a first rotation PRB group among the rotation PRB groups during a first period (S320); and (c) performing a service of the femtocell using a second rotation PRB group during a second period after the first period when a channel quality of the first rotation PRB group during the first period is not greater than a predetermined threshold or when the QoS is not ensured (S330).

In operation S310, the frequency resources allocated to the femtocell are divided into a plurality of PRB groups each having at least one PRB and then divided into n rotation PRB groups each having at least one PRB group.

FIG. 4 is a frequency resource management diagram over time for explaining the PRB rotation method among interference avoiding methods of the femtocell in accordance with an example embodiment of the present invention. The concept of the divided PRB groups and rotation PRB groups in operation S310 will be described with reference to FIG. 4. there are PRB groups 0 to 11 each having one PRB, and the PRB groups 8, 9, 10 and 11 belong to the first rotation PRB group 410, and the PRB groups 4, 5, 6 and 7 belong to the second rotation PRB group 420.

Next, operation S420 will also be described with reference to FIG. 4.

Referring to FIG. 4, when four (G)PRBs are used while the femtocell performs the service, the first PRB group 410 (having the PRBs 8, 9, 10 and 11) is allocated during the first Time 1. However, when the allocated channel quality (e.g., CQI) is poor or the QoS is not ensured, the second rotation PRB group 420 (having the PRBs 4, 5, 6 and 7) is allocated during the second Time 2. Similarly, when the allocated channel quality is poor or the QoS is not ensured even during the second Time 2, the third PRB group 430 (having the PRBs 0, 1, 2 and 3) is allocated during the third Time 3. That is, when the channel quality of the allocated PRB group (i.e., the first rotation PRB group) during the previous period is poor or the QoS is not ensured, resources for performing the service are changed to a different PRB group (i.e., the second rotation PRB group) during the next period.

The PRB rotation is employed for the following reasons. The preferred band of the macrocell is present as described in assumption 1), it is rare to use the full frequency band (use of full capacity) in an actual environment, and in particular, the full frequency band will not be used in the CER.

As such, the PRB rotation may be variously applied with the basic form as illustrated in FIG. 4. Since the PRB rotation method has an effect of allowing the macrocell base station to avoid the allocated resource region, it is possible to prevent the femtocell base station from being kept in a poor environment due to overlapping between specific resource allocation and resource allocation of the macrocell base station. Such mechanism may be applied not only to the downlink but also to the uplink. That is, the PRB rotation method may be applied to both the downlink frequency resources and the uplink frequency resources allocated to the femtocell.

In addition, the PRBs included in the rotation PRB group applied during the first period and the PRBs included in the rotation PRB group applied during the second period may not overlap, or at least some thereof may be configured to overlap. For example, referring to FIG. 4, the PRBs applied during the first and second periods do not overlap, however, some PRBs may overlap in consideration of the frequency resource management (i.e., overlapping scheme). For example, when the PRBs 8, 9, 10 and 11 are applied during the first Time 1, the PRBs 5, 6, 7 and 8 may be applied during the second Time 2 to have the overlapped PRB 8.

Interference Avoiding Method 2—PRB Transmission Power Restriction

FIG. 5 is a flow chart for explaining a method of restricting the PRB transmission power among interference avoiding methods of the femtocell in accordance with an example embodiment of the present invention.

Referring to FIG. 5, the method of restricting the PRB transmission power among interference avoiding methods of the femtocell in accordance with an example embodiment of the present invention includes (a) dividing frequency resources allocated to the femtocell into a plurality of PRB groups each having at least one PRB and then into n (n is a natural number not less than 2) power control PRB groups each having at least one PRB group (S510); (b) performing a service of the femtocell by applying one of at least two transmission power stages to transmission power for each of the power control PRB groups during a first period (S520); and (c) performing a service of the femtocell during a second period after the first period by decreasing the transmission power (i.e., applying low transmission power) set in the first period for the power control PRB group with a degraded interference level and maintaining or increasing the transmission power (i.e., applying high transmission power) set in the first period for the power control PRB group with an improved interference level after measuring the interference for each of the power control PRB groups during the first period (S530).

First, in operation (a) S510, in a similar way to operation (a) S310 of the interference avoiding method 1 described above, frequency resources allocated to the femtocell are divided into a plurality of PRB groups each having at least one PRB and then into n (n is a natural number not less than 2) power control PRB groups each having at least one PRB group.

In operation S520, one of at least two transmission power stages is applied to the transmission power for each of the power control PRB groups during the first period (Time 1) to perform the service. At this time, the transmission power stages include at least two stages, preferably, three levels of high, medium and low.

In this case, levels of the transmission power stage may be determined based on the transmission power (Ptx(HeNB)) obtained by the transmission power setting method of the femtocell according to an example embodiment of the present invention. For example, the levels may be determined using fixed power values (for example, when the fixed power value is 5 and the Ptx(HeNB) is 19, Ptx(high) is 19, Ptx(medium) is 14, and Ptx(low) is 9), and a difference between the determined Ptx(HeNB) and the Pmin is divided by the value (level (3)+1) to be used as the level change value. For example, in the case of three levels of high, medium and low, (3)+1=4, and when the determined Ptx is 20, the level change value may be determined as ((Ptx(20)−Pmin(0))/4, that is, 5). In this case, Ptx(high) is 20, Ptx(medium) is 15, and Ptx(low) is 10. Alternatively, when the determined Ptx is very small to be close to the value (i.e., Pmin), Ptx(high), Ptx(medium) and Ptx(low) may not be discriminated. In this case, there may be two transmission power stages, or the interference avoiding method 1 may be more preferred to the interference avoiding method 2.

Next, in operation S530, the transmission power stage during the next period is changed and applied for each of the power control PRB groups after the interference for each of the n power control PRB groups is measured during the first period.

For example, the transmission power set in the first period for the power control PRB group with a degraded interference level is decreased (i.e., low transmission power is applied), and the transmission power set in the first period for the power control PRB group with an improved interference level is kept or increased (i.e., high transmission power is applied), thereby performing a service of the femtocell during a second period after the first period.

Next, operation (b) S520 and operation (c) S530 will be described with reference to FIG. 6. Referring to FIG. 6, the transmission power stages include three stage levels of high, medium and low.

FIG. 6 is a frequency resource and transmission power management diagram over time for explaining a method of restricting the PRB transmission power among interference avoiding methods of the femtocell in accordance with an example embodiment of the present invention.

Referring to FIG. 6, it is assumed that one PRB forms one PRB group and one PRB group is allocated to one power control PRB group, and the PRB, the PRB group and the power control PRB are in one-to-one correspondence with each other.

Referring to FIG. 6, to perform the service of the femtocell, PRBs 2, 3, 4, 5, 6, 7, 8, 9, 10 and 11 are allocated for the Time 0 to use 10 (G)PRBs, and Ptx becomes Ptx(high) as an initial power in equation 1.

At this time, it is assumed that the PRBs 2, 3 and 4 are measured with high overloads and PRBs 5, 6, 7, 8, 9, 10 and 11 are measured with low overloads when the interference (overload) is measured for the (G)PRB at Time 1. As a result, the transmission power is changed to the Ptx(medium)(Ptx (high)—specific value (1)) for the former PRBs 2, 3 and 4.

It is assumed that the PRBs 2 and 4 are measured with medium overloads, the PRB 3 is measured with a high overload and the PRB 8 is newly measured with a high overload while the powers for the PRBs 2, 3 and 4 are set as Ptx (medium) at Time 2. As a result, the transmission power of the PRB 3 may be changed to Ptx(low)(Ptx(high)—specific value (2)) and the transmission power of the PRBs 2 and 4 may be selectively changed or kept (referring to FIG. 4, the previous power value was kept as Ptx(medium) for the PRB 2 and changed to Ptx(high) for the PRB 4). The PRB 8 is newly measured with a high overload, so that the transmission power is changed to Ptx(medium).

At Time 3, the PRB 3 is measured with a high overload even when the transmission power has been adjusted to Ptx (low). In this case, other (G)PRBs such as PRB0 or PRB1 may be allocated to have Ptx(high) as described in 2.2.1.

Such a mechanism can finely adjust the determined Ptx for each of the (G)PRBs when the femtocell base station uses the high capacity of resources, so that the interference between macrocell base stations can be finely tuned, and the macro terminal located in the CER of the macrocell can be prevented from being located in the femtocell coverage hole due to a relatively strong power of the femtocell.

The problem that the macro terminal located in the CER suffers from the coverage hole due to the strong power of the femtocell located in the CER of the macrocell base station described above can be solved by a solution that allows the femtocell to more finely classify the transmission power stages to decrease the (G)PRB Ptx in which the QoS can be implemented. The solution can solve the coverage hole problem of the macrocell due to the femtocell located in the CER.

Interference Avoiding Method 3—Hybrid Method

The femtocell may perform the interference avoiding method by combining interference avoiding method 1 of changing the resource in terms of the scheduler with interference avoiding method 2 of adjusting the power level in terms of the overload per (G)PRB.

For example, interference avoiding method 1, that is, the PRB rotation method, is performed referring to the QoS or CQI report from the terminal during a predetermined period. At this time, the CQI may be set for the wideband (full band) or a specific subband (specific (G)PRB) so that the CQI may be utilized for the (G)PRB rotation. However, when the overload per (G)PRB can be measured, the (G)PRB rotation may be performed only on the PRBs with the overload as described in interference avoiding method 2. When the QoS is not satisfied in the PRB rotation method during the predetermined period, interference avoiding method 2, that is, the PRB transmission power restriction method, may be used.

On the other hand, interference avoiding method 2 may be used first, and then interference avoiding method 1 may be used when the QoS is not satisfied by interference avoiding method 2.

Such a combined method may be implemented using a specific rule rather than in a sequential manner. For example, the UB may be broadly divided into three parts, wherein interference avoiding method 1 and interference avoiding method 2 (or interference avoiding method 2 and interference avoiding method 1) may be sequentially performed for the first part, interference avoiding method 1 and interference avoiding method 2 (or interference avoiding method 2 and interference avoiding method 1) may be sequentially performed for the second part when a problem occurs in the first part, and interference avoiding method 1 and interference avoiding method 2 (or interference avoiding method 2 and interference avoiding method 1) may be sequentially performed for the third part when another problem occurs. Such methods may be performed in an overlapping manner. This is because the frequency band to be used might have been changed by the fractional frequency reuse (FFR) mechanism of the macrocell base station.

However, if the terminal connected to the femtocell is not provided with the satisfactory service even by all such methods described above, the corresponding terminal may be outbound-handed over to another base station. On the other hand, when it is determined that the QoS is common to most terminals connected to the femtocell, the corresponding femtocell may perform the treatment on all connected terminals (e.g., disconnection or outbound handover) and enter an initialization installation operation.

Interference Avoiding Method 4—UB Rotation Method

FIG. 7 is a flow chart for explaining an UB (Used Band; operation carrier) rotation method among interference avoiding methods of the femtocell in accordance with an example embodiment of the present invention.

Referring to FIG. 7, the UB rotation method among interference avoiding methods of the femtocell in accordance with an example embodiment of the present invention is a method of controlling the interference of the femtocell in which plural frequency bands capable of being allocated by a service provider are present, and the method includes (a) performing a service of the femtocell using a first frequency band during a first period (S710); and (b) performing a service of the femtocell using a second frequency band during a second period after the first period (S720).

That is, as long as the femtocell is capable of changing the UB, in a similar way to the interference avoiding method 1 (PRB rotation method), the UB itself can be changed by the interference avoiding methods 1, 2, and 3 described above even when the strong interference occurs.

For example, when a service provider performs frequency allocation (FA) such that the allocated frequency bands 1-30 are divided into the frequency bands 1-10 (A), 11-20 (B) and 21-30 (C) so as to use the cells, automatically changing the UB itself by changing the UB in an sequential order of A, B and C at the femtocell base station may be the most preferred method for the femtocell base station located in the ICR of the macrocell base station using the same UB.

In addition, when the location of the macrocell base station is very close to the location of the femtocell itself based on the information about the macrocell included in message information after the femtocell receives the message information from the ANR component (i.e., when the macrocell base station is located in the ICR of the base station 1), it may be a very fast interference control method to immediately change the UB as long as the femtocell has the function of changing the UB.

In this case, when the macrocell base station is located in the ICR, it is possible to use the Pmax as the transmission power of the femtocell. In other words, even when the femtocell transmits the power of Pmax, the ICR macrocell station and other macrocell stations are not affected.

According to the methods of controlling the interference of the femtocell described above, the femtocell itself can avoid the interference on a macrocell, and the macrocell cannot be interfered with by the femtocell at the time of initial installation and management of the femtocell in an environment where the macrocell and the femtocell overlap. In particular, the femtocell itself can control the interference without affecting an interface of an existing macrocell base station and without coordination with the macrocell through the interface with the macrocell.

While the example embodiments of the present invention and their advantages have been described in detail, it should be understood that various changes, substitutions and alterations may be made herein without departing from the scope of the invention.

What is claimed is:

1. A method of controlling interference of a femtocell at a femtocell base station, comprising:
   (a) dividing frequency resources allocated to the femto cell into a plurality of physical resource block (PRB) groups each having at least one PRB and dividing the plurality of PRB groups into N power control PRB groups each having at least one PRB group, wherein N is a natural number not less than 2;
   (b) performing a service of the femtocell by applying one of at least two transmission power stages to transmission power for each of the power control PRB groups during a first period; and
   (c) performing the service of the femtocell during a second period after the first period by decreasing the transmission power stage set in the first period for the power control PRB group with a degraded interference level and maintaining or increasing the transmission power stage set in the first period for the power control PRB group with an improved interference level after measuring the interference for each of the power control PRB groups during the first period.

2. The method of claim 1, wherein, in operation (b), when the first period is one that performs the service with initial transmission power of the femtocell, a highest transmission power among the transmission power stages is set as a stage that can be used for all of the n power control PRB groups.

3. The method of claim 1, wherein the at least two transmission power stages comprise at least three stages of high, medium and low.

4. The method of claim 1, wherein, in operation (c), when the power control PRB group to which the lowest transmission power stage is applied does not have an improved interference level even after the second period, the femtocell does not perform the service through the power control PRB group.

5. The method of claim 1, wherein the method of controlling the interference of the femtocell is performed at the femtocell base station, without coordination with a macrocell base station.

* * * * *